(12) United States Patent
Keck et al.

(10) Patent No.: US 7,033,989 B2
(45) Date of Patent: Apr. 25, 2006

(54) HIGH-CONCENTRATION AQUEOUS SOLUTIONS OF BETAINES OR AMINE OXIDES

(75) Inventors: Helmut Keck, Burgkirchen (DE); Frank Weinelt, Burgkirchen (DE)

(73) Assignee: Goldschmidt GmbH, Essen (DE)

( * ) Notice: Subject to any disclaimer, the term of this patent is extended or adjusted under 35 U.S.C. 154(b) by 29 days.

(21) Appl. No.: 10/371,085

(22) Filed: Feb. 21, 2003

(65) Prior Publication Data

US 2003/0162952 A1 Aug. 28, 2003

(30) Foreign Application Priority Data

Feb. 23, 2002 (DE) ................ 102 07 924

(51) Int. Cl.
*C11D 1/66* (2006.01)
*C11D 1/88* (2006.01)
*C11D 1/90* (2006.01)

(52) U.S. Cl. .............. 510/503; 510/504; 514/58
(58) Field of Classification Search ........ 510/503, 510/504; 514/54, 58, 59
See application file for complete search history.

(56) References Cited

U.S. PATENT DOCUMENTS

| | | | | |
|---|---|---|---|---|
| 4,861,517 A * | 8/1989 | Bade | | 510/535 |
| 5,006,273 A * | 4/1991 | Machin et al. | | 510/418 |
| 5,039,451 A * | 8/1991 | Phillips et al. | | 516/69 |
| 5,244,652 A * | 9/1993 | Michaels | | 424/54 |
| 5,292,954 A * | 3/1994 | Borland et al. | | 564/298 |
| 5,354,906 A | 10/1994 | Weitemeyer et al. | | 554/52 |
| 5,442,113 A * | 8/1995 | Blezard et al. | | 564/2 |
| 5,583,258 A | 12/1996 | Hawkins | | 564/298 |
| 5,760,258 A | 6/1998 | Papenfuhs | | 554/66 |
| 5,877,143 A * | 3/1999 | Abbas et al. | | 510/433 |
| 5,962,708 A | 10/1999 | Hamann et al. | | 554/69 |
| 6,335,370 B1 | 1/2002 | De Mesanstourne et al. | | 514/642 |

FOREIGN PATENT DOCUMENTS

| | | |
|---|---|---|
| DE | 44 08 228 | 9/1995 |
| DE | 195 05 196 | 5/1996 |
| DE | 197 38 634 | 3/1999 |
| EP | 0 353 580 | 2/1990 |
| EP | 0 560 114 | 9/1993 |
| EP | 0 739 878 | 10/1996 |
| WO | WO 97/07094 | 2/1997 |
| WO | WO 99/24157 | 5/1999 |

OTHER PUBLICATIONS

Saenger, W. et al "Cyclodextrins increase surface tension . . . " Angew. Chem. Int. Ed. Engl. (1988) vol. 27, pp. 393-394.*
English abstract for DE 4408228, Sep. 14, 1995.
English abstract for DE 19505196, May 2, 1996.
English abstract for DE 19738634, Mar. 11, 1999.
English abstract for JP 10-130223, May 19, 1998.
English abstract for EP 0353580, Feb. 7, 1990.

* cited by examiner

Primary Examiner—Leigh C. Maier
(74) Attorney, Agent, or Firm—Frommer Lawrence & Haug LLP

(57) ABSTRACT

The present invention relates to a composition and a method for preparing high-concentration aqueous solutions of betaines or amine oxides which comprise a water-soluble carbohydrate. The high-concentration aqueous solutions of the present invention are pumpable, viscous liquids which are self preserving and remain storage stable for long periods without any bacterial decomposition. The high-concentration aqueous solutions of the present invention are prepared by adding a water-soluble carbohydrate such as cyclodextrins or dextrans to an aqueous solution of the betaine or amine oxide and concentrating the aqueous solution to provide the high-concentration aqueous solution.

5 Claims, No Drawings

HIGH-CONCENTRATION AQUEOUS SOLUTIONS OF BETAINES OR AMINE OXIDES

The invention relates to high-concentration aqueous solutions of betaines or amine oxides with an active ingredient content of these surfactants of at least 30% by weight at a pH of from 2 to 12 which, in the presence of small amounts of a water-soluble carbohydrate, are in the form of viscous liquids.

It is known that amphoteric surfactants, in particular betaines, form lyotropic crystalline phases in water above surfactant contents (WS) of 30% by weight depending on the fatty acids used for their preparation. These phases are of solid consistency and behave like solid bodies. They are no longer pumpable and are difficult for the user to handle.

EP-A-353 580 describes that the phase behavior of surfactants can be influenced by adding cosurfactants, for example by adding nonionic surfactants. A reduction in the viscosity of aqueous surfactant solutions can, as is known, also be achieved by solvents, for example n-alcohols or polyhydric alcohols. For example, WO 99/24157 describes solutions of betaines which comprise precisely defined amounts of betaine, water and ethanol.

EP 560 114 describes aqueous liquid solutions of a betaine with a solids content of at least 40% by weight, characterized by a content of 1 to 3% by weight of one or more saturated or unsaturated fatty acids and 0 to 4% by weight of glycerol based on the solution. Fatty acid and glycerol are added to the reaction mixture before or during quaternization of the tertiary amine with chloroacetic acid.

However, to change the phase behavior of surfactants using cosurfactants, relatively large amounts are required. The addition of lyophilic additives changes the surfactant properties, which may be disadvantageous for the user. In addition, in some circumstances, cosurfactant and solvent are undesired in the formulation.

The object of the invention is to prepare as highly concentrated as possible aqueous solutions of betaines or amine oxides which are pumpable and easy to handle and comprise no cosurfactants or volatile or ecotoxicologically problematical organic solvents. The surfactant solutions should be sufficiently concentrated for them to be self-preserving due to the reduced water content, and for them to remain storage-stable for a long period without any bacterial decomposition.

The invention provides high-concentration aqueous solutions of betaines or amine oxides which comprise a water-soluble carbohydrate.

Suitable betaines and amine oxides are, in particular, those of the following formulae:

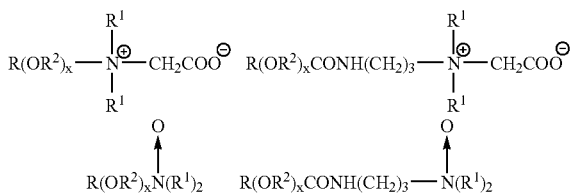

where R is an alkyl, hydroxyalkyl or alkylphenyl group having 8 to 22 carbon atoms, each radical $R^1$, independently of the others, is an alkyl or hydroxyalkyl group having 1 to 3 carbon atoms or a polyethylene oxide group having 1 to 3 ethylene oxide units, or two $R^1$ groups are joined together via an —O or —NH group to form a ring, $R^2$ is an alkylene group having 2 to 3 carbon atoms or mixtures thereof and x is an number from 0 to 10.

Particular preferred amine oxides are $C_{10}$–$C_{18}$-alkyldimethylamine oxides and $C_8$–$C_{12}$-alkoxyethyl-dihydroxyethylamine oxides.

Suitable water-soluble carbohydrates are, for example, hydrophilic cyclodextrins, cyclodextrin derivatives, dextrins, dextrans or mono-, oligo- or polysaccharides.

Cyclodextrins, also called cycloglucans, can be formed during the degradation of starch by *Bacillus macarans* or *Bacillus circulans* under the action of cyclodextrin glycosyltransferase. The cyclodextrins consist essentially of 6, 7 or 8 α-linked glucose units. According to the invention, it is possible to use all cyclodextrin monomers, for example α-, β-, γ-cyclodextrin. Likewise suitable are cyclodextrin derivatives, such as, for example, cyclodextrin carbonates, ethers or polyethers, or cyclodextrin derivatives in which one or more hydroxyl groups are substituted by functional radicals. Such functional radicals include, for example, methyl, ethyl, hydroxyethyl, hydroxypropyl, acetyl or amino groups. Any mixtures of cyclodextrins and/or cyclodextrin derivatives can also be used.

Suitable mono-, di- and polysaccharides are, for example, glucose, fructose, sorbose, arabinose, xylose, ribose, mannose, galactose, lactose, dextrose, sucrose, maltose, cellobiose, raffinose and amylose.

The liquid-viscous surfactant solutions according to the invention comprise one or more of the water-soluble carbohydrates described above in amounts by weight of from 0.05 to 2% by weight, preferably 0.1 to 1% by weight, particularly preferably 0.2 to 0.5% by weight, based on the amphoteric surfactant solution. The concentration of surfactant can here be adjusted to values above 30% by weight.

These high-concentration liquid surfactant solutions can be prepared by two methods.

One or more of the abovementioned water-soluble carbohydrates are mixed into standard commercial aqueous surfactant solutions, for example an aqueous solution comprising 30% by weight of cocoamidopropylbetaine (Genagen CAB) at temperatures above 60° C., preferably at 65° C. to 80° C., the mixture is stirred for 15 minutes to 30 minutes and then water is removed from the solution with stirring at 90° C. to 100° C., preferably 95° C. to 98° C. Concentration of the solution can be accelerated by removing water vapor by passing a stream of nitrogen over the surface of the solution.

In this way, it is possible to obtain surfactant concentrates which, at room temperature, have a liquid-viscous consistency at a surfactant content WS of from 32 to 38% by weight.

In accordance with a second method, these high-concentration surfactant solutions can be obtained by adding the water-soluble carbohydrate to the reaction mixture during the synthesis of the surfactant. The synthesis of the betaines and amine oxides takes place in a known manner. Modification of the synthesis conditions is not necessary here.

The surfactant solutions according to the invention satisfy the requirement of being free from cosurfactants and organic solvents. They are liquid-viscose even at a cyclodextrin content of from 0.1 to 0.5% by weight with WS contents of up to 38% by weight or solids contents up to 46% by weight.

The examples below serve to illustrate the invention in more detail without limiting it thereto:

EXAMPLES

Example 1

Preparation of a Cocoamidopropylbetaine Solution with an Active Ingredient Content of 38% in the Presence of β-cyclodextrin (Cavamax W7)

206.5 g of demineralized water, 2.13 g (0.5% m/M based on the total initial weight) of β-cyclodextrin (Wacker) and 131.6 g of cocoamidopropylamine (0.40 mol) were initially introduced into a 1 l stirrable flask and heated to 75–80° C. with stirring. Then, 36.54 ml of monochloroacetic acid (80% strength) (103.5 n/n based on amidopropylamine) and 21.9 ml of sodium hydroxide solution (50% strength) (110% n/n based on amidopropylamine) were added over a period of 25 minutes and the mixture was after-stirred for 15 minutes at 75 to 80° C. 1.1 ml of NaOH (50% strength) were added to adjust the pH to 8.0 to 8.5, the temperature was increased to 80 to 85° C. over the course of an hour, and the mixture was stirred for 1 hour at 80° C. to 85° C., then the temperature was increased to 85° C. to 90° C. over the course of 30 minutes and the mixture was after-stirred for 1 hour and, finally, heated to 90° C. to 95° C. over the course of 30 minutes and after-stirred at 90° C. to 95° C. for 5 hours.

4.0 g of citric acid (50% strength) were used to adjust the pH to 5.0 to 5.5.

Example 2

Preparation of a Cocoamidopropylbetaine Solution with an Active Ingredient Content of 37% in the Presence of β-cyclodextrin (Cavamax W7)

221.1 g of demineralized water, 0.88 g (0.2% m/M based on the total initial weight) of β-cyclodextrin (Wacker) and 131.6 g of cocoamidopropylamine (0.40 mol) were initially introduced into a 1 l stirrable flask and heated to 75–80° C. with stirring. Then, 36.54 ml of monochloroacetic acid (80% strength) (103.5 n/n based on amidopropylamine) and 21.9 ml of sodium hydroxide solution (50% strength) (110% n/n based on amidopropylamine) were added over a period of 15 minutes, and the mixture was after-stirred at 75 to 80° C. for 15 minutes. 1.1 ml of NaOH (50% strength) were added to adjust the pH to 8.0 to 8.5, the temperature was increased to 80 to 85° C. over the course of an hour, and the mixture was stirred at 80° C. to 85° C. for 1 hour, then the temperature was increased to 85° C. to 90° C. over the course of 30 minutes, and the mixture was after-stirred for 1 hour and, finally, heated to 90° C. to 95° C. over the course of 30 minutes and after-stirred at 90° C. to 95° C. for 5 hours.

4.0 g of citric acid (50% strength) were used to adjust the pH to 5.0 to 5.5.

Example 3

Preparation of a Cocoamidopropylbetaine Solution with an Active Ingredient Content of 37% in the Presence of Sucrose 206.5 g of demineralized water, 4.26 g (1.0% m/M based on the total initial weight) of sucrose (Raffinade RF/Südzucker) and 131.6 g of cocoamidopropylamine (0.40 mol) were initially introduced into a 1 l stirrable flask and heated to 75–80° C. with stirring. Then, 36.54 ml of monochloroacetic acid (80% strength) (103.5 n/n based on amidopropylamine) and 21.9 ml of sodium hydroxide solution (50% strength) (110% n/n based on amidopropylamine) were added over a period of 15 minutes and the mixture was after-stirred at 75 to 80° C. for 15 minutes. 1.1 ml of NaOH (50% strength) were added to adjust the pH to 8.0 to 8.5, the temperature was increased to 80 to 85° C. over the course of an hour and the mixture was stirred at 80° C. to 85° C. for 1 hour, then the temperature was increased to 85° C. to 90° C. over the course of 30 minutes and the mixture was after-stirred for 1 hour and, finally, heated to 90° C. to 95° C. over the course of 30 minutes and after-stirred at 90° C. to 95° C. for 5 hours.

4.0 g of citric acid (50% strength) were used to adjust the pH to 5.0 to 5.5.

Example 4

Preparation of a Cocodimethylamine Oxide Solution with an Active Ingredient Content of 35%

377.9 g of demineralized water, 233.6 g of dimethylcocoamine (®Genamin CC 302 D) (1.0 mol), 0.1 g of an organic complexing agent (Trilon B) and 1.4 g of β-cyclodextrin (0.2% m/M), based on the total initial weight, were initially introduced, at ambient temperature, into the reaction flask, heated to a bottom temperature of from 70° C. to 75° C. with stirring and, at 70° C. to 80° C., 100.1 g of hydrogen peroxide 35% (103% n/n) were added dropwise over the course of 30 minutes.

The solution was then concentrated as described in examples 1 to 3. This gave a solution with an amine oxide concentration of 34.5% by weight.

Example 5

Preparation of a Cocoamidopropylbetaine Solution with an Active Ingredient Content of 37% in the Presence of β-cyclodextrin (Cavasol W7HP)

221.1 g of demineralized water, 2.13 g (0.5% m/M based on the total initial weight) of hydroxypropyl-β-cyclodextrin (Wacker) and 131.6 g of cocoamidopropylamine (0.40 mol) were initially introduced into a 1 l stirrable flask and heated to 75–80° C. with stirring. Then, 36.54 ml of monochloroacetic acid (80% strength) (103.5 n/n based on amidopropylamine) and 21.9 ml of sodium hydroxide solution (50% strength) (110% n/n based on amidopropylamine) were added over a period of 15 minutes, and the mixture was after-stirred for 15 minutes at 75° C. to 80° C. 1.1 ml of NaOH (50% strength) were added to adjust the pH to 8.0 to 8.5, the temperature was increased to 80 to 85° C. over the course of an hour and stirred at 80° C. to 85° C. for 1 hour, then the temperature was increased to 85° C. to 90° C. over the course of 30 minutes and the mixture was after-stirred for 1 hour and, finally, the mixture was heated to 90° C. to 95° C. over the course of 30 minutes and after-stirred for 5 hours at 90° C. to 95° C.

4.0 g of citric acid (50% strength) were used to adjust the pH to 5.0 to 5.5.

Example 6

Preparation of a Cocoamidopropylbetaine Solution with an Active Ingredient Content of 37% in the Presence of γ-cyclodextrin (Cavamax W8)

221.1 g of demineralized water, 2.13 g (0.5% m/M based on the total initial weight) of γ-cyclodextrin (Wacker) and 131.6 g of cocoamidopropylamine (0.40 mol) were initially introduced into a 1 l stirrable flask and heated to 75–80° C. with stirring. Then, 36.54 ml of monochloroacetic acid (80% strength) (103.5 n/n based on amidopropylamine) and 21.9 ml of sodium hydroxide solution (50% strength) (110% n/n based on amidopropylamine) were added over a period of 15 minutes, and the mixture was after-stirred at 75 to 80° C. for 15 minutes. 1.1 ml of NaOH (50% strength) were added to adjust the pH to 8.0 to 8.5, the temperature was increased to 80 to 85° C. over the course of an hour, and the mixture was stirred at 80° C. to 85° C. for 1 hour, then the temperature was increased to 85° C. to 90° C. over the course of 30 minutes and the mixture was after-stirred for 1 hour and, finally, the mixture was heated to 90° C. to 95° C. over the course of 30 minutes and after-stirred at 90° C. to 95° C. for 5 hours.

4.0 g of citric acid (50% strength) were used to adjust the pH to 5.0 to 5.5.

Example 7

Concentration of a Cocoamidopropylbetaine Solution by Stripping Off Water in the Presence of β-cyclodextrin 200.0 g of cocoamidopropylbetaine solution (®Genagen CAB 818) were treated, with stirring at ambient temperature, with 0.33 g of β-cyclodextrin (Cavamax W7), corresponding to 0.2% by weight, based on the final adjustment. The active ingredient content in the betaine solution was 29.8% by weight.

The flask contents were heated, with stirring, to a bottom temperature of about 80° C. At this temperature, the mixture was after-stirred for 30 minutes. Then, the flask contents were heated with stirring to about 98° C. to strip off water. In order to accelerate the stripping off of water, a gentle stream of nitrogen was passed over the surface of the betaine solution.

When the calculated amount of water had been stripped off, the flask contents were cooled, with stirring, to about 40° C. and drawn off.

The content of water and sodium chloride was determined from a sample of this concentrated cocoamidopropylbetaine solution.

This procedure gave 163.7 g of a cocoamidopropylbetaine solution (final adjustment) with an active ingredient content of 36.4% by weight, which has a liquid-viscous consistency at room temperature.

What is claimed is:

1. A method for preparing a pumpable, high-concentration aqueous liquid solution of betaines or amine oxides, said method consisting of admixing 32 to 38 percent by weight of said betaines or amine oxides during or after synthesis of said betaines or amine oxides in water and from 0.05 to 2 percent by weight of a cyclodextrin selected from the group consisting of β-cyclodextrin, γ-cyclodextrin, and mixtures thereof and optionally removing a portion of the water to provide said pumpable, high-concentration aqueous liquid solution.

2. The method of claim 1, wherein the betaines or amine oxides are compounds of the following formulae

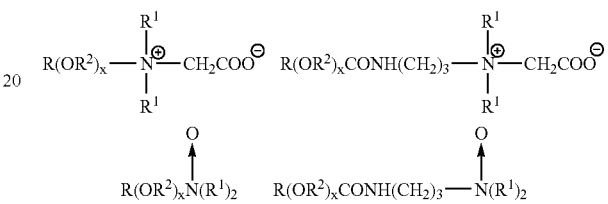

where R is an alkyl, hydroxyalkyl or alkylphenyl group having 8 to 22 carbon atoms, each radical $R^1$, independently of the others, is an alkyl or hydroxyalkyl group having 1 to 3 carbon atoms or a polyethylene oxide group having 1 to 3 ethylene oxide units, or two $R^1$ groups are joined together via an —O or —NH group to form a ring, $R^2$ is an alkylene group having 2 to 3 carbon atoms or mixtures thereof and x is an number from 0 to 10.

3. The method of claim 1, wherein the amine oxide or betaines is cocoamidopropylbetaine and the cyclodextrin is β-cyclodextrin.

4. The method of claim 1, wherein the betaines is a synthesis product of cocoamidopropylamine and monochloroacetic acid in the presence of sodium hydroxide and the cyclodextrin is γ-cyclodextrin.

5. A pumpable, viscous liquid prepared according to the method of claim 1.

\* \* \* \* \*